US011068455B2

(12) United States Patent
Shabi et al.

(10) Patent No.: US 11,068,455 B2
(45) Date of Patent: Jul. 20, 2021

(54) MAPPER TREE WITH SUPER LEAF NODES

(71) Applicant: EMC IP Holding Company LLC, Hopkinton, MA (US)

(72) Inventors: Uri Shabi, Tel Mond (IL); Dror Zalstein, Givatayim (IL); Ronen Gazit, Tel Aviv (IL); Vladimir Shveidel, Pardes-Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 258 days.

(21) Appl. No.: 16/395,887

(22) Filed: Apr. 26, 2019

(65) Prior Publication Data

US 2020/0341959 A1 Oct. 29, 2020

(51) Int. Cl.
  *G06F 16/00* (2019.01)
  *G06F 16/22* (2019.01)
(52) U.S. Cl.
  CPC ...... *G06F 16/2246* (2019.01); *G06F 16/2228* (2019.01)
(58) Field of Classification Search
  CPC .......................... G06F 16/2228; G06F 16/2246
  See application file for complete search history.

(56) References Cited

U.S. PATENT DOCUMENTS

| 6,278,992 | B1 |  | 8/2001 | Curtis et al. | |
|---|---|---|---|---|---|
| 6,282,605 | B1 |  | 8/2001 | Moore | |
| 8,838,895 | B2 |  | 9/2014 | Yi et al. | |
| 8,892,569 | B2 |  | 11/2014 | Bowman et al. | |
| 9,619,165 | B1 | * | 4/2017 | Shelton | G06F 3/0638 |
| 10,191,813 | B2 |  | 1/2019 | Fan et al. | |
| 2003/0135704 | A1 | * | 7/2003 | Martin | G06F 11/1435 711/162 |
| 2011/0066808 | A1 | * | 3/2011 | Flynn | G06F 12/0866 711/118 |
| 2013/0204902 | A1 | * | 8/2013 | Wang | G06F 16/2365 707/797 |
| 2014/0280356 | A1 | * | 9/2014 | Danilak | G06F 12/0238 707/796 |
| 2016/0350325 | A1 | * | 12/2016 | Wang | G06F 3/067 |
| 2019/0318022 | A1 | * | 10/2019 | Haber | G06F 16/2237 |
| 2020/0065408 | A1 | * | 2/2020 | Desai | G06F 16/2246 |
| 2020/0175074 | A1 | * | 6/2020 | Li | G06F 12/0871 |

OTHER PUBLICATIONS

Dillon, Matthew, "The Hammer Filesystem", Dragonfly BSD 2.0, Jun. 21, 2008, <<https://www.dragonflybsd.org/hammer/hammer.pdf>> 14 pages.
Kaldirim, Semih, "File Organization, ISAM, B+ Tree and Bulk Loading", Week 13—Apr. 28, 2015, <<http://www.cs.bilkent.edu.tr/~canf/CS281Spring15LectureNotesFeb13/Week13.pdf>> 7 pages.

* cited by examiner

*Primary Examiner* — Alexander Khong
(74) *Attorney, Agent, or Firm* — BainwoodHuang

(57) ABSTRACT

A mapper tree for a logical volume is provided by storing, in each leaf node of the mapper tree, pointers to pages of non-volatile storage that store host data written to corresponding pages within a segment of the logical address space of the logical volume that corresponds to the leaf node. In response to receiving an initial write operation directed to a segment of the logical address space of the logical volume for which no leaf node currently exists in the mapper tree, a representation of a new leaf node is added to a super leaf node in the mapper tree that efficiently stores representations of multiple leaf nodes.

17 Claims, 8 Drawing Sheets

MAPPER TREE WITH SUPER LEAF NODES

TECHNICAL FIELD

The present disclosure relates generally to technology for reducing the amount of metadata needed to support a logical volume of non-volatile storage, and more specifically, to using super leaf nodes in a mapper tree to reduce the amount of metadata needed for a logical volume.

BACKGROUND

Data storage systems are arrangements of hardware and software that include non-volatile data storage devices (e.g. electronic flash drives, magnetic disk drives, and/or optical drives) that are used to provide non-volatile storage for processing host I/O (Input/Output) requests (i.e. write requests and/or read requests) received from one or more host computers. The host I/O requests that are processed by a data storage system may include block I/O requests as well as file I/O requests. The host I/O requests indicate host data that is stored in logical volumes of non-volatile storage that are contained in and maintained by the data storage system.

The data storage system performs various data storage services that organize and secure host data received from host computers on the non-volatile data storage devices of the data storage system.

When processing a host I/O request, a data storage system may access a logical volume of non-volatile storage hosted within the data storage system. The logical volume may, for example, be used to store host data indicated by a host I/O write request.

SUMMARY

A data storage system may determine the location of the specific physical non-volatile storage that is mapped to a portion of the logical address space of the logical volume that is accessed by a given host I/O request by traversing a tree data structure referred to as a "mapper tree" stored in the metadata of the logical volume. For example, a data storage system may use the mapper tree to represent the mappings between specific pages within the logical address space of the logical volume and corresponding physical pages of non-volatile storage allocated to store host data written to those pages of logical address space. Processing of each host I/O request that is directed to the logical volume may include a traversal of the logical volume's mapper tree in order to identify the physical page of non-volatile storage that corresponds to the logical page accessed within the logical volume by the host I/O request. The mapper tree may be a tree made up of "m" levels of nodes, where each node corresponds to a contiguous segment of the logical address space of the logical volume and may contain N pointers to lower level nodes, as follows:

Level 1: The top level of the mapper tree, in which each node may contain a maximum of N pointers to Level 2 nodes, Level 2: The next lower level after Level 1, in which each node may contain a maximum of N pointers to Level 3 nodes, . . . {other upper levels} . . .

Level m: The lowest level or "leaf level", containing leaf nodes. Each leaf node may contain a maximum of N pointers that indicate pages of physical non-volatile storage that are allocated to the logical volume to store pages of the host data written to the logical volume.

For example, each page may be 4 kilobytes (KBs), each node of the mapper tree may be one page in length (storing both pointers and other metadata), N may equal 512 (such that each node in the mapper tree may contain a maximum of 512 pointers), and m may equal 3 (such that there are three levels in the mapper tree). Further in such an example, i) each leaf node may contain up to 512 pointers to 4 KB pages of non-volatile storage, and correspond to a contiguous 2 megabyte (MB) segment of the logical address space of the logical volume (512×4 KB), ii) each second level node may contain up to 512 pointers to leaf nodes, and corresponds to 1 gigabyte (GB) of the logical address space of the logical volume (512×2 MB), and iii) each first level node may contain up to 512 pointers to second level nodes, and corresponds to 512 GB of the logical address space of the logical volume (512×1 GB). In order to limit the total amount of metadata used to support the logical volume, individual nodes of the mapping tree may be added to the mapping tree only as they are actually needed to process host I/O requests that are specifically directed to the corresponding segment of the logical address space of the logical volume, e.g. upon the first occurrence of a write to the corresponding segment of the logical address space of the logical volume. For example, each individual leaf node may be added to the mapper tree only in response to processing the first write operation that results in an access to the corresponding 2 MB segment of the logical address space of the logical volume, etc.

Some previous technologies have exhibited significant shortcomings with regard to the relatively large amount of space needed to store metadata required for the mapping tree when the writes to the logical volume are sparsely distributed across the logical address space of the logical volume. For example, in some previous technologies, in the case where the received host I/O requests processed by the data storage system result in writes to a single page of host data located within each 512 GB of the logical address space that corresponds to a first level node, three mapper tree nodes must be allocated to represent each individual page of host data, e.g. one node at level 1, one node at level 2, and one leaf level node. In this way, the amount of metadata needed to support the mapping tree of the logical volume could be a multiple of (e.g. three times) the amount of host data that is stored by the logical volume. Such a disproportionately large amount of metadata is inefficient in terms of data storage resource utilization, and is accordingly undesirable for a data storage system. Moreover, the sparse distribution of writes across a logical address space of a logical volume may occur in many circumstances, e.g. during the formatting of a database.

It would accordingly be desirable to have data storage technology that can reduce the amount of data storage needed to store the mapper tree for a logical volume, especially in situations where writes to the logical volume are sparsely distributed across the logical address space of the logical volume.

To address the above described and other shortcomings of previous technologies, technology is disclosed herein that efficiently provides a mapper tree for a logical volume. Each leaf node of the mapper tree stores pointers indicating pages of non-volatile storage that store host data written to pages within a corresponding segment of the logical address space of the logical volume. In the disclosed technology, in response to receiving an initial write operation directed to a segment of the logical address space of the logical volume for which no corresponding leaf node exists in the mapper tree, a new leaf node corresponding to that segment of the logical address space may be added to a super leaf node that stores multiple leaf nodes, thus avoiding the need to create a new node in the leaf level of the mapping tree for the new leaf node.

In some embodiments, the super leaf node may include multiple slots, and each slot in the super leaf node may contain a representation of one of the leaf nodes contained in the super leaf node. In such embodiments, adding the new leaf node to the super leaf node may include adding a representation of the new leaf node to the super leaf node.

In some embodiments, adding the representation of the new leaf node to the super leaf node may include adding, to the representation of the new leaf node in the super leaf node that stores the representation of the new leaf node, a pointer indicating a page of non-volatile storage that is used to store the host data indicated by the initial write operation.

In some embodiments, adding the pointer indicating the page of non-volatile storage that is used to store the host data indicated by the initial write operation to the representation of the new leaf node in the super leaf node may include storing a tuple indicating both a pointer to the page of non-volatile storage that stores the host data indicated by the initial write operation and an offset indicating the page within the logical address space of the logical volume to which the initial write operation was directed, i.e. an offset of the page to which the initial write operation was directed within the logical address space segment corresponding to the new leaf node added to the super leaf node.

In some embodiments, in response to detecting that an amount of available space within the super leaf node is less than a minimum threshold, the disclosed technology may identify a representation of a leaf node contained in the super leaf node that includes a larger number of pointers to pages of non-volatile storage than any other representation of a leaf node in the super leaf node. The disclosed technology may then remove, from the super leaf node, the leaf node representation that includes a larger number of pointers to pages of non-volatile storage than any other representation of a leaf node contained in the super leaf node.

In some embodiments, the disclosed technology may detect that an amount of available space within the super leaf node is less than a minimum threshold in response to attempting to add a pointer to a page of non-volatile storage to a super leaf node.

In some embodiments, in response to detecting that a representation of a leaf node contained in the super leaf node includes a total number of pointers to pages of non-volatile storage that exceeds a maximum threshold, the disclosed technology may remove, from the super leaf node, the leaf node representation in the super leaf node that includes the total number of pointers to pages of non-volatile storage that exceeds the maximum threshold.

In some embodiments, the disclosed technology may detect that a representation of a leaf node in the super leaf node includes a number of pointers to pages of non-volatile storage that exceeds a maximum threshold by detecting that the representation of the leaf node in the super leaf node includes a number of pointers to pages of non-volatile storage that exceeds a predetermined maximum percentage (e.g. 90 percent) of the maximum number of pointers to pages of non-volatile storage that can be stored in a leaf node.

In some embodiments, in response to detecting that no super leaf node exists in the mapper tree to store a new leaf node, the disclosed technology may add a super leaf node to the mapper tree prior to adding the new leaf node to the super leaf node.

In some embodiments, each leaf node and each super leaf node in the mapper tree may have the same size, e.g. each may have a size equal to one page.

Embodiments of the disclosed technology may provide significant improvements over previous technologies. By efficiently representing multiple leaf nodes within a single super leaf node, embodiments of the disclosed technology may advantageously reduce the amount of data storage needed to store metadata needed for a logical volume, even under circumstances in which writes to the logical volume are sparsely distributed across the logical address space of the logical volume. Embodiments of the disclosed technology may accordingly avoid the need to store the disproportionately large amounts of metadata that were sometimes needed to represent the mapper tree for a logical volume in previous technologies.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed upon illustrating the principles of various embodiments of the disclosed technology.

DETAILED DESCRIPTION

Embodiments of the invention will now be described. The embodiments described herein are only examples of how features and principles of the invention may be embodied. The invention itself is accordingly broader than the examples described below.

The technology disclosed herein provides a mapper tree for a logical volume. Each leaf node of the mapper tree stores pointers indicating pages of non-volatile storage that store host data written to pages within a corresponding segment of the logical address space of the logical volume. In response to receiving an initial write operation directed to a segment of the logical address space of the logical volume for which no corresponding leaf node exists in the mapper tree, the disclosed technology may add a new leaf node corresponding to that segment of the logical address space to a super leaf node that stores multiple leaf nodes. By providing at least one super leaf node that contains multiple leaf nodes, the disclosed technology avoids the need to create a new node in a leaf level of the mapping tree for each new leaf node that is added to the mapper tree. In some embodiments, each super leaf node may include multiple slots, and each slot in a super leaf node may store a representation of a leaf node that is contained in that super leaf node. Adding a new leaf node to a super leaf node in such embodiments may include adding a representation of the new leaf node to a slot within the super leaf node.

Figure 1:
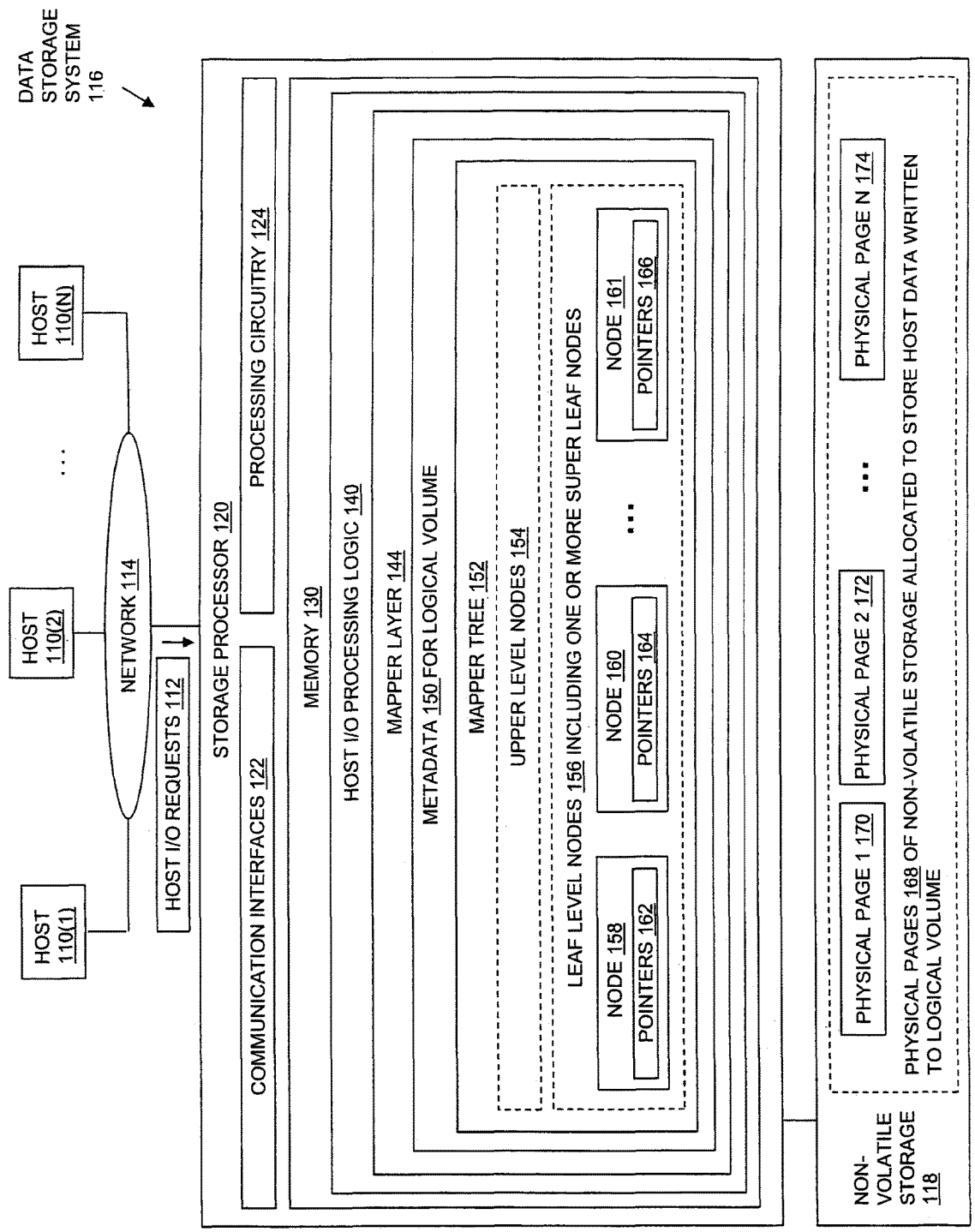
FIG. 1 is a block diagram showing an example of components in some embodiments and an operational environment.

FIG. 1 shows an example of an operational environment in which embodiments of the disclosed technology can operate, and an illustrative embodiment of the disclosed technology. As shown in FIG. 1, one or more host computers ("Hosts"), shown as host computers 110(1) through 110(N), and/or host applications executing in whole or in part on host computers 110(1) through 110(N), access non-volatile storage provided by Data Storage System 116 over a Network 114. Data Storage System 116 includes at least one Storage Processor 120 and Non-Volatile Storage 118. Data Storage System 116 may include one or more storage processors like Storage Processor 120. In some embodiments, multiple storage processors may be provided as circuit board assemblies, or "blades," which plug into a chassis that encloses and cools the storage processor. Those skilled in the art will recognize, however, that no particular configuration of storage processors is required, as any number of storage processors, including a single storage processor, may be provided and that Storage Processor 120 may be any type of computing device that is capable of processing host I/O requests.

Non-Volatile Storage 118 may include or consist of some number of disk drives. The disk drives in Non-Volatile Storage 118 may include magnetic disk drives, electronic flash drives, optical drives, and/or other types of non-volatile data storage drives or devices. Non-Volatile Storage 118 may include some number of pages of non-volatile storage, which may also be referred to as blocks, and are shown for purposes of illustration by Physical Page 1 170, Physical Page 2, and so on through Physical Page N 174. Each physical page of non-volatile storage has the same length, for example 4 KB. In some embodiments, Non-Volatile Storage 118 may, for example, be organized into RAID groups, where each RAID group is composed of multiple disk drives in Non-Volatile Storage 118.

Network 114 may include or consist of any type of network or combination of networks, such as, for example, a storage area network (SAN), a local area network (LAN), a wide area network (WAN), the Internet, and/or some other type of network or combination of networks.

Hosts 110(1-N) and/or host applications executing in whole or in part on Hosts 110(1-N) may logically connect to and communicate with the Storage Processor 120 using various technologies. For example, Host I/O Requests 112 conveyed from Hosts 110(1-N) to Storage Processor 120 may include block I/O requests (read requests and/or write requests) communicated from Hosts 110(1-N) to Storage Processor 120 using block storage interfaces and protocols such as, for example, the Small Computer System Interface (SCSI), Fibre Channel (FC), Serial Attached SCSI (SAS), Internet Small Computer System Interface (iSCSI), and/or other block storage interfaces and/or protocols. Host I/O Requests 112 conveyed from Hosts 110(1-N) to Storage Processor 120 may further include file I/O requests (read requests and/or write requests) communicated from Hosts 110(1-N) to the Storage Processor 120 using file storage interfaces and protocols such as, for example, the Network File System (NFS) distributed file system protocol, the Server Message Block (SMB)/Common Internet File System (CIFS) application-layer network protocol, Apple Filing Protocol (AFP), and/or other file storage interfaces and/or protocols. Storage Processor 120 may accordingly be configured to receive host I/O requests through block-based and/or file-based storage protocols, and to respond to host I/O requests of either type by reading or writing the Non-Volatile Storage 118.

Storage Processor 120 may include one or more Communication Interfaces 122, Processing Circuitry 124, and Memory 130. The Communication Interfaces 122 of Storage Processor 120 may include, for example, SCSI target adapters and/or network interface adapters that convert electronic and/or optical signals received over Network 114 into electronic form for use by Storage Processor 120.

Processing Circuitry 124 may be embodied as at least one processor core that is capable of independently reading and executing threads of program instructions as they are scheduled for execution. Processing Circuitry 124 may be integrated into a single central processing unit chip or chip package. Processing Circuitry 124 may be a subset of the processor cores contained in Storage Processor 120, or may be the only processor core contained in Storage Processor 120.

Memory 130 may include both volatile memory (e.g., RAM), and/or non-volatile memory (e.g. ROM, disk drives, solid state drives, portions of Non-Volatile Storage 118, etc.). Processing Circuitry 124 and Memory 130 together may form specialized control circuitry, which is constructed and arranged to carry out specific methods and functions as described herein. As shown in FIG. 1, Memory 130 stores specialized software components and data structures that may be provided at least in part in the form of executable program instructions. When the executable instructions of the software components shown in FIG. 1 are executed by Processing Circuitry 124, Processing Circuitry 124 performs the methods and functionality of the software. Although certain specific software constructs are shown in FIG. 1 and described herein, those skilled in the art will recognize that Memory 130 may further include various other types of software constructs, which are not shown.

In the example of FIG. 1, the software components in Memory 130 include Host I/O Processing Logic 140, which provides program logic for processing and/or supporting the processing of the Host I/O Requests 112 received by Storage Processor 120. Host I/O Requests 112 processed by Host I/O Processing Logic 140 may include host I/O requests (e.g. host I/O read requests, host I/O write requests) directed to various types of block data objects hosted by Data Storage System 116 using Non-Volatile Storage 118, such as logical disks (e.g. logical units sometimes referred to as LUNs) and/or block-based virtual volumes (VVols). Host I/O Requests 112 processed by Host I/O Processing Logic 140 may also or alternatively include host I/O requests (e.g. host I/O read requests, host I/O write requests) directed to file data objects hosted by Data Storage System 116 using Non-Volatile Storage 118, such as files or file systems.

During the processing of Host I/O Requests 112, Host I/O Processing Logic 140 creates at least one logical volume of non-volatile storage allocated to the logical volume from the Non-Volatile Storage 118, and then uses the logical volume to store host data received indicated by and/or received in the Host I/O Requests 112 while processing Host I/O Requests 112. The logical volume created by Host I/O Processing Logic 140 may store one or more of the host accessible data objects that are hosted by Data Storage System 116.

For each logical volume created by Host I/O Processing Logic 140, Mapper Layer 144 creates associated metadata that is used by Host I/O Processing Logic 140 while processing host I/O requests resulting in accesses to that logical volume. FIG. 1 shows an example of Metadata 150 that is created and maintained by Mapper Layer 144 for one of the logical volumes created by Host I/O Processing Logic 140. Metadata 150 includes a Mapper Tree 152. For each request in Host I/O Requests 112 that results in an access to the associated logical volume, Mapper Layer 144 traverses the Mapper Tree 152 to determine the location of the specific page of physical non-volatile storage in Non-Volatile Storage 118 allocated to the logical volume that corresponds to the page within the logical address space of the logical volume that is accessed by the request. Mapper Tree 152 accordingly represents mappings between pages within the logical address space of the logical volume and corresponding physical pages of non-volatile storage that are used to store host data written to the corresponding pages in the logical address space. In some embodiments, some or all of Mapper Tree 152 may be made up of a B-tree, which is an example of a self-balancing tree data structure.

Mapper Tree 152 includes Upper Level Nodes 154 and Leaf Level Nodes 156. Mapper Tree 152 may be made up of "m" levels of nodes, with Leaf Level Nodes 156 being a lowest level of Mapper Tree 152, and all other levels of nodes being within Upper Level Nodes 156. Each node in Mapper Tree 152 may contain up to N pointers. In some embodiments, each node in the Mapper Tree 152 may have the same size, e.g. may be made up of a single 4 KB page in Memory 130.

In some embodiments, Upper Level Nodes 154 may include m−1 levels, e.g. a Level 1 and a Level 2 when m=3. For example, Level 1 may be a top level of Mapper Tree 152, in which each node may contain up to N pointers to nodes in a Level 2 that is the next lower level after Level 1. Each node in Level 2 of the Mapper Tree 152 may contain up to N pointers to nodes in a next lower level after Level 2, and so on through a level that is immediately above the Leaf Level Nodes 156. Those skilled in the art will recognize that Upper Level Nodes 154 is not limited to having two levels, and may contain other numbers of levels for values of m other than 3.

The lowest level of Mapper Tree 152 is Leaf Level Nodes 156. The nodes in Leaf Level Nodes 156 are shown to include Node 158, Node 160, and so on through Node 161. Each node in Leaf Level Nodes 156 contains pointers that indicate (e.g. point to) pages of non-volatile storage that are allocated to the logical volume and are used to store host data written to the logical volume. For example, Node 158 contains Pointers 162, Node 160 contains Pointers 164, and so on through Node 161, which contains Pointers 166.

Leaf Level Nodes 156 may include some number of leaf nodes and one or more super leaf nodes. Each leaf node may contain up to N pointers indicating pages of physical non-volatile storage that are allocated to store pages of host data written to a corresponding segment within the logical address space of the logical volume. Each super leaf node in Leaf Level Nodes 156 may contain representations of multiple leaf nodes, and contains pointers indicating physical pages of non-volatile storage used to store host data written to the segments of logical address space corresponding to the multiple leaf nodes it contains.

For example, N may equal 512, such that each node in Mapper Tree 152 may contain up to 512 pointers, and m may equal 3, such that there are three total levels in Mapper Tree 152. In such an example, each leaf node may contain up to 512 pointers, and each pointer in a leaf node indicates a 4 KB page of non-volatile storage. Further in such an example, each leaf node corresponds to a contiguous 2 MB segment of the logical address space of the logical volume (512×4 KB). In order to limit the total amount of metadata used to support the logical volume, each individual leaf node may be added to Mapping Tree 152 only when it is needed to process host I/O requests that are specifically directed to the corresponding segment of the logical address space of the logical volume, e.g. upon the first occurrence of a write to the corresponding segment of the logical address space of the logical volume.

In the case where N=512, each leaf node in Leaf Level Nodes 156 may store up to 512 pointers indicating pages of non-volatile storage that store host data written to pages within the segment of the logical address space of the logical volume that corresponds to the leaf node. Each representation of a leaf node in a super leaf node in Leaf Level Nodes 156 stores pointers indicating pages of non-volatile storage that store host data written to pages within the segment of the logical address space of the logical volume that corresponds to the represented leaf node. Accordingly, in embodiments in which leaf nodes and super leaf nodes have the same size, and in which N=512, a super leaf node may store up to 512 pointers indicating pages of non-volatile storage that are used to store host data written within any of the segments of logical address space corresponding to the multiple leaf nodes it contains. However, those skilled in the art will recognize that the disclosed technology is not limited to embodiments in which N=512, and that the specific number of pointers contained in each node of the Mapper Tree 152 may be some other specific value.

In response to receipt of an initial write operation directed to a segment of the logical address space of the logical volume for which no corresponding leaf node currently exists in Mapper Tree 152, Mapper Layer 144 may add a new leaf node corresponding to that segment of the logical address space to a super leaf node in Leaf Level Nodes 156. For example, in some embodiments, each super leaf node may represent multiple leaf node slots, with each leaf node representation contained in one of multiple slots in the super leaf node that are capable of representing the leaf nodes contained in the super leaf node. In such embodiments, Mapper Layer 144 may add a new leaf node corresponding to a segment of the logical address space to which an initial write operation is directed to a super leaf node at least in part by adding a representation of the new leaf node to the super leaf node, e.g. by adding a representation of the new leaf node to a slot within the super leaf node. A new pointer indicating the super leaf node containing the representation of the new leaf node may then be added to a node in the level of nodes in Upper Level Nodes 154 immediately above Leaf Level Nodes 156, for use when traversing Mapper Tree 152 to process subsequent host I/O operations that access the segment of the logical address space corresponding to the new leaf node represented within the logical volume. Because a single super leaf node may contain representations of multiple leaf nodes, multiple nodes in the level of nodes in Upper Level Nodes 154 immediately above Leaf Level Nodes 156 may contain pointers indicating a single super leaf node.

In some embodiments, as part of or in addition to adding the representation of the new leaf node to the super leaf node, Mapper Layer 144 may add a pointer to a page of non-volatile storage to the representation of the new leaf node that was added to the super leaf node. The page of non-volatile storage indicated by the pointer added to the representation of the new leaf node may be used by Host I/O Processing Logic 140 to store host data indicated by the initial write operation, and also when processing subsequent operations on the logical volume that are directed to the same page within the segment of the logical address space corresponding to the new leaf node.

In some embodiments, Mapper Layer 144 may add a pointer indicating a page of non-volatile storage to a super leaf node by adding a tuple to a leaf node representation contained in the super leaf node, where the tuple includes both the pointer to the page of non-volatile storage and an offset of the specific corresponding page within the segment of the logical address space corresponding to the represented leaf node. For example, in response to an initial write operation to a segment, the added tuple may contain both a pointer indicating the page of non-volatile storage used to store the host data indicated by the initial write operation, and an offset of the specific page within the segment in the logical address space of the logical volume to which the initial write operation was directed, e.g. an offset of the specific page to which the initial write operation was directed within the segment of the logical address space corresponding to the new leaf node that was added to the super leaf node.

In some embodiments, Mapper Layer 144 may detect that an amount of currently available space within a super leaf node is less than some minimum threshold. For example, Mapper Layer 144 may detect that the amount of available space within a super leaf node is less than a minimum threshold when a representation of a leaf node cannot be added to the super leaf node, when a pointer to a page of non-volatile storage cannot be added to the super leaf node, or when the number of pointers that can be added to the super leaf is less than ten percent of the total number of pointers that can be stored in the super leaf (e.g. is less than ten percent of N). In some embodiments, the disclosed technology may detect that an amount of currently available space within the super leaf node is less than the minimum threshold in response to attempting to a representation of a new leaf node to the super leaf node, or in response to attempting to add a pointer to a page of non-volatile storage to the super leaf node.

In response to detecting that the amount of space currently available within the super leaf node is less than the minimum threshold, Mapper Layer 144 may identify a representation of a leaf node contained in the super leaf node that includes a number of pointers indicating pages of non-volatile storage that is larger than the number of pointers included in any other representation of a leaf node contained in the super leaf node. The Mapper Layer 144 may then remove, from the super leaf node, the leaf node representation that includes the number of pointers to pages of non-volatile storage that is larger than the number of pointers included in any other representation of a leaf node contained in the super leaf node. Mapper Layer 144 may then create a separate leaf node in Leaf Level Nodes 156 to store the leaf node whose representation was removed from the super leaf node. In this way, Mapper Layer 144 may create available space in the super leaf node for storing representations of other leaf nodes and/or pointers to pages of non-volatile storage that can then be added to the super leaf node.

In some embodiments, Mapper Layer 144 may detect that that a representation of a leaf node contained in the super leaf node includes a total number of pointers indicating pages of non-volatile storage that exceeds a maximum threshold, e.g. is greater than ninety percent of the number N (e.g. 512) that is the maximum number of pointers that can be contained in a single node. For example, in some embodiments, the disclosed technology may detect that a representation of a leaf node contained in the super leaf node includes a total number of pointers to pages of non-volatile storage that exceeds the maximum threshold in response to attempting to add a representation of a leaf node or a pointer to a page of non-volatile storage to the super leaf node.

In response to detecting that a representation of a leaf node contained in the super leaf node includes a total number of pointers to pages of non-volatile storage that exceeds the maximum threshold, Mapper Layer 144 may then remove, from the super leaf node, the leaf node representation contained in the super leaf node that includes a total number of pointers to pages of non-volatile storage that exceeds the maximum threshold. Mapper Layer 144 may then create a separate leaf node in Leaf Level Nodes 156 to store the leaf node whose representation was removed from the super leaf node. In this way, Mapper Layer 144 may also create available space in the super leaf node for storing representations of other leaf nodes and/or pointers to pages of non-volatile storage that can then be added to the super leaf node.

In some embodiments, in response to detecting that no super leaf node exists in the mapper tree to store a new leaf node, Mapper Layer 144 may add a super leaf node to Leaf Level Nodes 156 in Mapper Tree 152 prior to adding a representation of a new leaf node to the newly added super leaf node.

Figure 2:
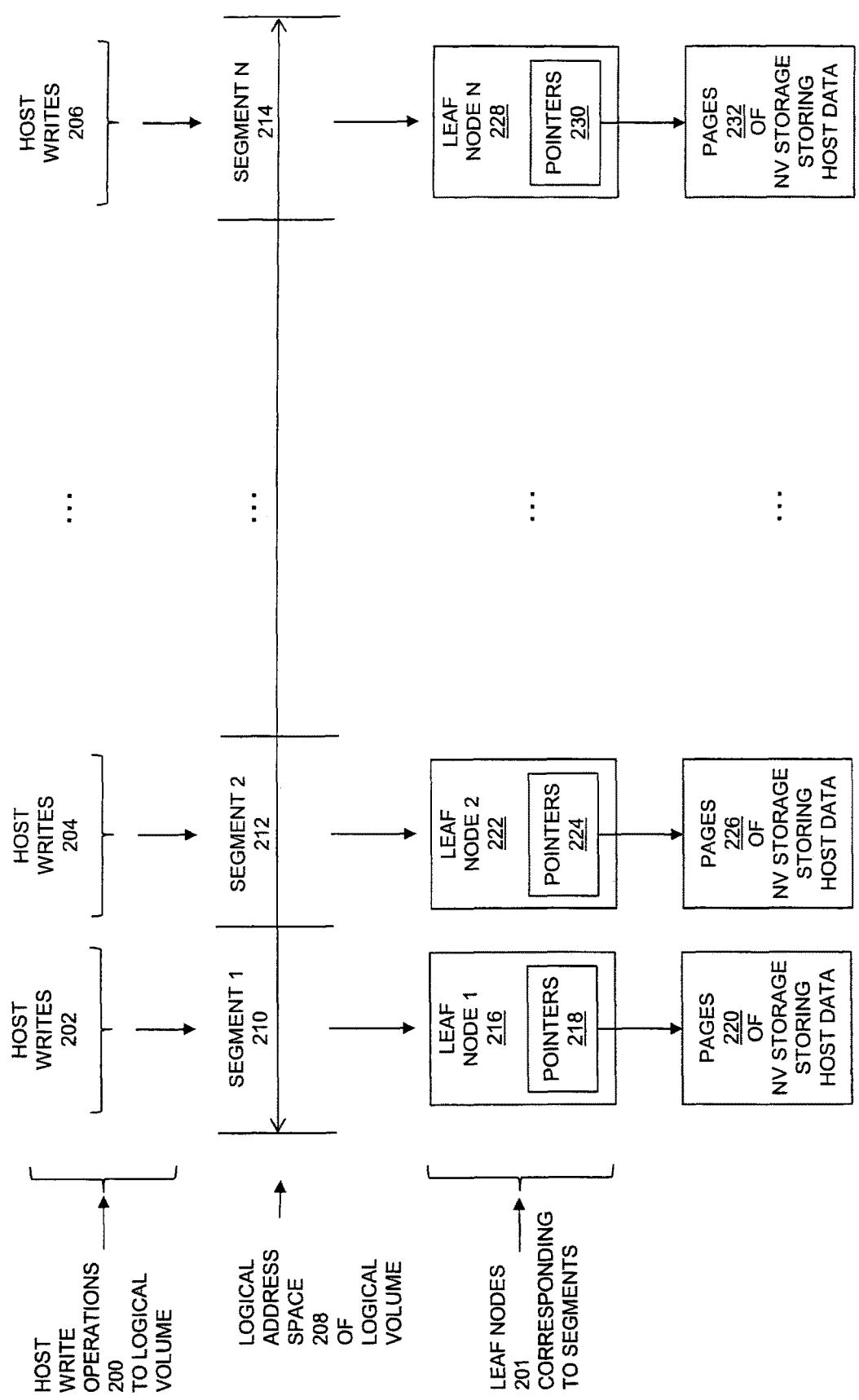
FIG. 2 is a block diagram showing an example of segments in a logical address space of a logical volume, and corresponding leaf nodes for a mapping tree for the logical volume.

FIG. 2 is a block diagram showing an example of segments in a Logical Address Space 208 of a logical volume, and of the corresponding Leaf Nodes 201 in a mapping tree for the logical volume. As shown in FIG. 2, Logical Address Space 208 may be divided into segments, shown by Segment 1 210, Segment 2 212, and so on through Segment N 214. The disclosed technology may be embodied using any specific length of logical address space, and various specific sizes of segments within the logical address space. For example, each segment within the Logical Address Space 208 may have a size of 2 MB. In such an example, each leaf node may store up to 512 pointers, each of which indicating a 4 KB page of non-volatile storage.

In the example of FIG. 2, Leaf Node 1 216 corresponds to Segment 1 210, Leaf Node 2 222 corresponds to Segment 2 212, and so on through Leaf Node N 228, which corresponds to Segment N 214.

Each one of the Leaf Nodes 201 contains pointers indicating pages of non-volatile storage that are used to store host data written to the segment of the logical address space corresponding to the leaf node. Accordingly, Leaf Node 1 216 contains Pointers 218 that indicate Pages 220 of non-volatile storage, and Pages 220 are used to store host data indicated by Host Writes 202, which are directed to logical addresses (e.g. logical block addresses sometimes referred to as "LBAs") that fall within Segment 1 210. Leaf Node 2 222 contains Pointers 224 that indicate Pages 226 of non-volatile storage, and Pages 226 are used to store host data indicated by Host Writes 204, which are directed to logical addresses that fall within Segment 2 212. The Leaf Nodes 201 continue on similarly through Leaf Node N 228, which contains Pointers 230 that indicate Pages 232 of non-volatile storage, that are used to store host data indicated by Host Writes 206, which are directed to logical addresses that fall within Segment N 214.

The pointers in a given leaf node may be arranged sequentially, in correspondence with an order of the pages within the corresponding segment of the logical address space. For example, a first pointer in Pointers 218 may indicate a page of non-volatile storage that is used to store the host data indicated by write operations directed to a first page within Segment 1 210 (e.g. the page with the lowest block number in the segment), a second pointer in Pointers 218 may indicate a page of non-volatile storage that is used to store the host data indicated by write operations directed to a second page within Segment 1 210 (e.g. the page with the second lowest block number in the segment), and so on.

In order to conserve data storage resources, each leaf node may be added to the mapper tree only upon an initial write to the corresponding segment. Accordingly, Leaf Node 1 216 may be added to the mapper tree in response to receipt of the first write operation directed to a logical address within Segment 1 210, Leaf Node 2 222 may be added to the mapper tree in response to receipt of the first write operation directed to a logical address within Segment 2 212, and so on through Leaf Node N 228, which may be added to the mapper tree in response to receipt of the first write operation directed to a logical address within Segment N 214.

Figure 3:
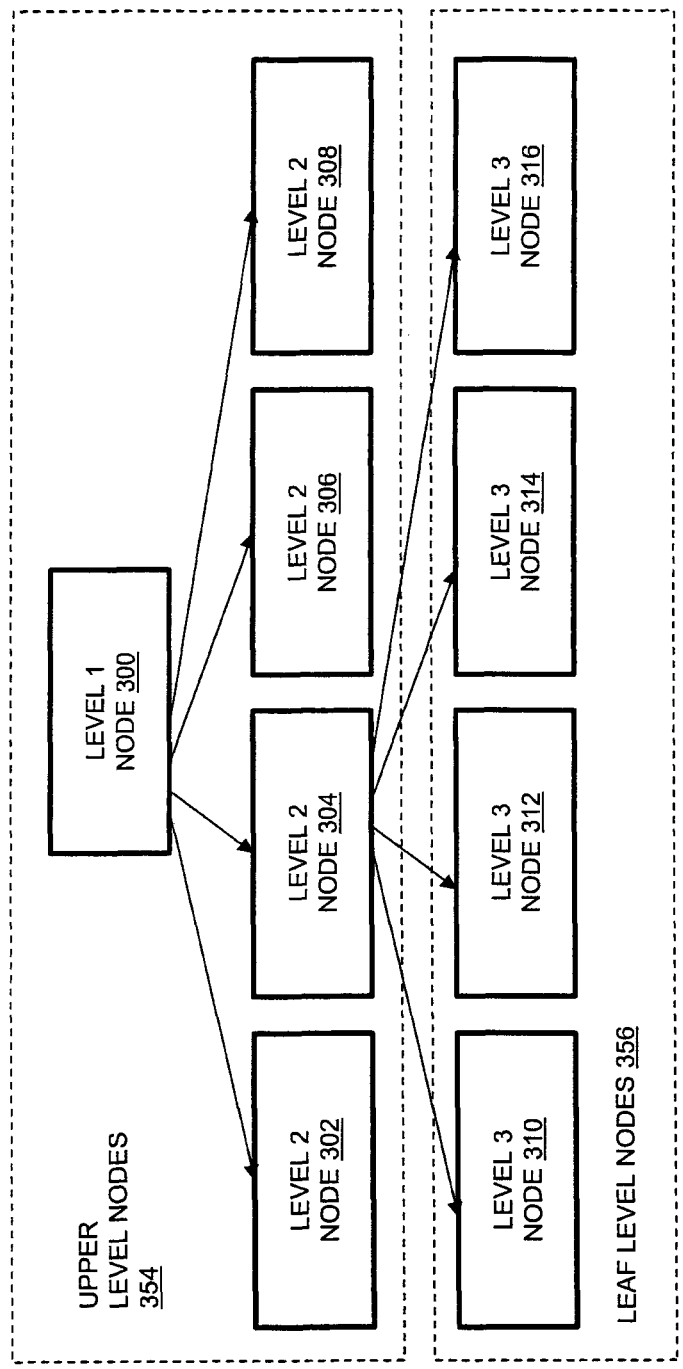
FIG. 3 is a block diagram showing a simplified example of a mapper tree in some embodiments.

FIG. 3 is a block diagram showing a simplified example of a mapper tree in some embodiments. In the example of FIG. 3, the total number of levels in the mapper tree is three (e.g. m=3). The Upper Level Nodes 354 include two levels: a first level (also referred to as "level 1"), and a second level (also referred to as "level 2"). The first level is shown including a Level 1 Node 300. The second level is shown including Level 2 Node 302, Level 2 Node 304, Level 2 Node 306, and Level 2 Node 308. The Leaf Level Nodes 356 (also referred to as the "level 3 nodes") include Level 3 Node 310, Level 3 Node 312, Level 3 Node 314, and Level 3 Node 316.

In the example of FIG. 3, each level 1 node may contain pointers to a maximum of N level 2 nodes, each level 2 node may contain pointers to a maximum of N level 3 nodes.

Each node in Leaf Level Nodes 356 may contain a maximum of N pointers to pages of non-volatile storage. Each node in the Leaf Level Nodes 356 may be either i) a leaf node containing a maximum of N pointers indicating pages of non-volatile storage used to store host data written to the single segment of the logical address space corresponding to that leaf node, or ii) a super leaf node containing representations of multiple leaf nodes, and containing a maximum of N pointers indicating pages of non-volatile storage used to store host data written to any of the segments of the logical address space corresponding to those multiple leaf nodes that are contained in the super leaf node.

Figure 4:
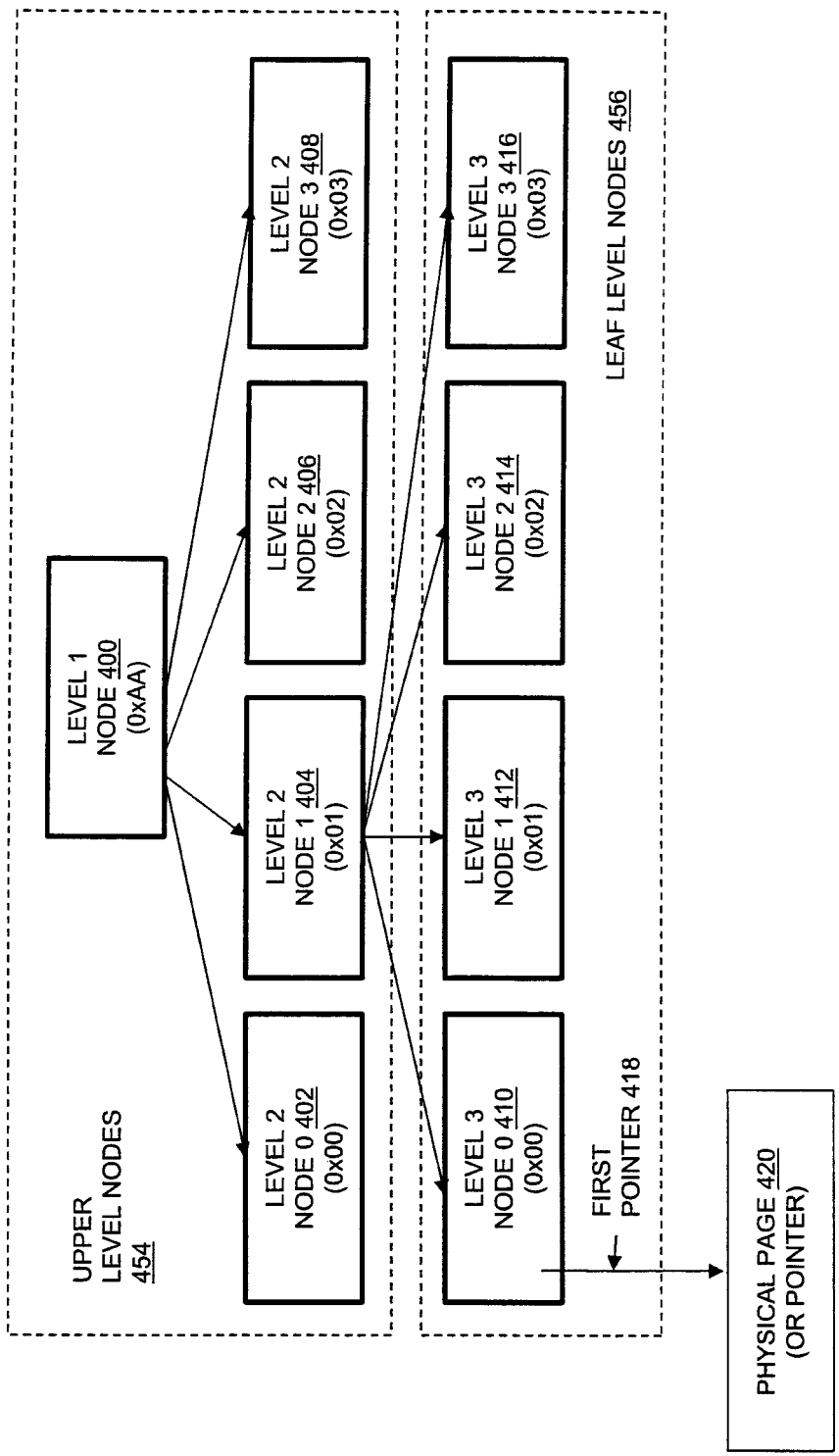
FIG. 4 is a block diagram showing another simplified example of a mapper tree in some embodiments, and showing a traversal of the mapper tree to find a page of non-volatile storage.

FIG. 4 is a block diagram showing another simplified example of a mapper tree in some embodiments, and showing a traversal of the mapper tree to find a page of non-volatile storage. The mapper tree in FIG. 4 includes three total levels, and accordingly m=3.

The Upper Level Nodes 454 in FIG. 4 include two levels: a first level (also referred to as "level 1"), and a second level (also referred to as "level 2"). The first level is shown including a Level 1 Node 400. The second level is shown including Level 2 Node 0 402, Level 2 Node 1 404, Level 2 Node 3 406, and Level 2 Node 4 408. The Leaf Level Nodes 456 (also referred to as the "level 3 nodes") include Level 3 Node 0 410, Level 3 Node 1 412, Level 3 Node 2 414, and Level 3 Node 3 416.

In the example of FIG. 4, each node may contain a maximum number N pointers to nodes in the next lower level, and N=256. Also in the example of FIG. 4, each page within the logical address space is a 4 KB block within the logical address space, and each page of non-volatile storage is a 4 KB block of non-volatile storage. Each pointer in a node within the Leaf Level Nodes 456 points indicates a single 4 KB block of non-volatile storage. Accordingly, in the example of FIG. 4, each leaf node in Leaf Level Nodes 456 may contain up to 256 pointers to 4 KB blocks of non-volatile storage, and accordingly each leaf node in Leaf Level Nodes 456 corresponds to a 1 MB segment within the logical address space. Each level 2 node may contain up to 256 pointers to leaf nodes in the Leaf Level Nodes 456, and accordingly each level 2 node corresponds to 256 MB within the logical address space. Each level 1 node may contain up to 256 pointers to level 2 nodes, and accordingly each level 1 node corresponds to 64 GB within the logical address space.

Further with reference to the example of FIG. 4, the logical addresses used to indicate specific pages within the logical address space to which individual write operations are directed are logical block addresses (LBAs). Each level 1 node is associated with a highest offset within the LBA, each level 2 node is associated with a second highest offset within the LBA, and each leaf node in the Leaf Level Nodes 456 is associated with a third highest offset within the LBA.

For example, in order to process a write operation directed to LBA 0xAA010000000 within the logical address space of the logical volume, a node in Level 1 is first visited that corresponds to the value of the highest offset within the LBA, e.g. a node in Level 1 that corresponds to 0xAA. In FIG. 1, Level 1 Node 400 corresponds to a highest offset value of 0xAA. In order to identify the next node to be visited during the traversal (i.e. the node within Level 2 to be visited after Level 1 Node 400), a pointer within Level 1 Node 400 is then located that corresponds to the value of the next highest offset within the LBA. In this example, the value of the next highest offset within the LBA is 0x01, and the pointer in Level 1 Node 400 is located that corresponds to 0x01, e.g. the pointer in the 0x01 position within the pointers contained in Level 1 Node 400, which is a pointer to Level 2 Node 1 404.

A pointer within Level 2 Node 1 404 is then located that corresponds to the value of the next highest offset within the LBA. In this example, the value of the next highest offset within the LBA is 0x00, and the pointer in Level 2 Node 404 is located that corresponds to 0x00, e.g. the pointer in the 0x00 position within the pointers contained in Level 2 Node 404, which is a pointer to Level 3 Node 0 410.

A pointer within Level 2 Node 1 404 is then located that corresponds to the value of the next highest offset within the LBA. In this example, the value of the next highest offset within the LBA is 0x00, and the pointer in Level 2 Node 1 404 is located that corresponds to 0x00, e.g. the pointer in the 0x00 position within the pointers contained in Level 2 Node 1 404, which is a pointer to Level 3 Node 0 410.

A pointer within Level 3 Node 0 410 is then located that corresponds to the value of the next highest offset within the LBA. In this example, the value of the next highest offset within the LBA is 0x00, and the pointer in Level 3 Node 0 410 is located that corresponds to 0x00, e.g. a First Pointer 418 that is located within the 0x00 position within the pointers contained in Level 3 Node 410. First Pointer 418 may indicate (e.g. point to) a Physical Page 420 that is a block of non-volatile storage into which is stored the host data indicated by the write operation directed to LBA 0xAA010000000 of the logical volume. Alternatively, First Pointer 418 may point to another pointer or logical address, and that pointer or logical address may indicate (e.g. point to) the block of non-volatile storage into which is stored the host data indicated by a write operation directed to LBA 0xAA010000000 within the logical address space of the logical volume.

Figure 5:
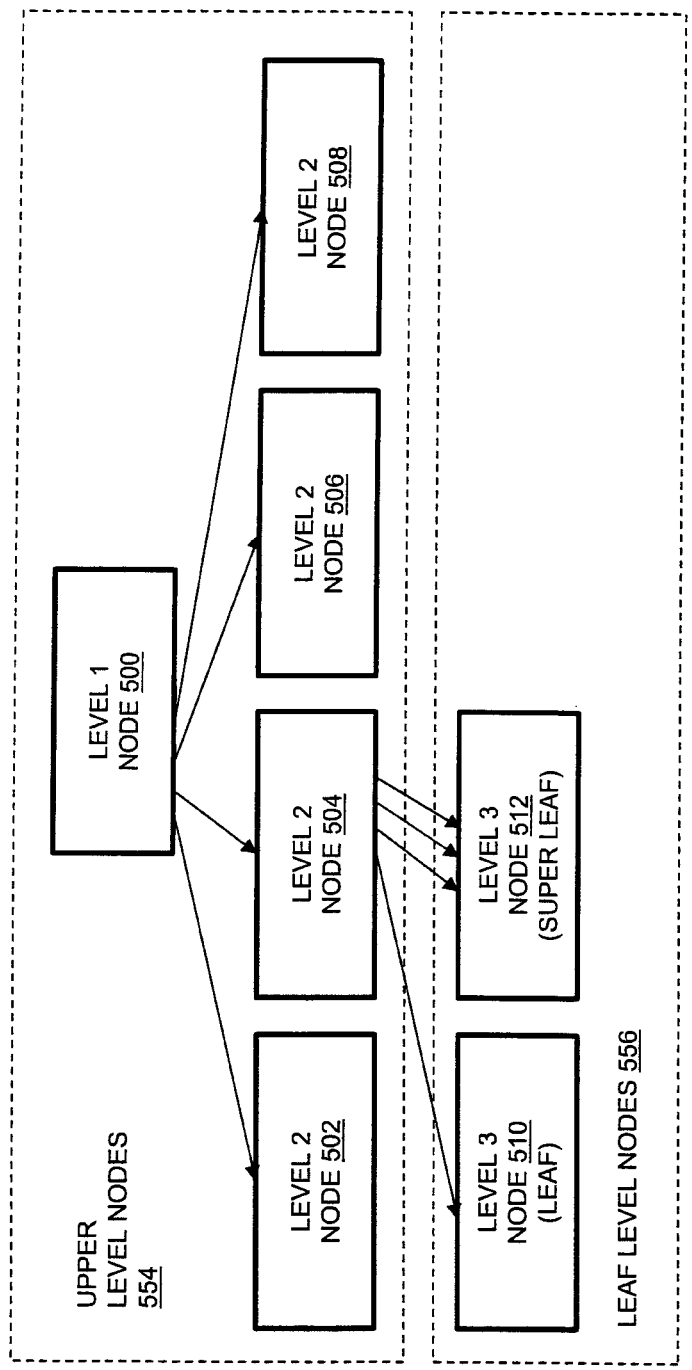
FIG. 5 is a block diagram showing another simplified example of a mapper tree in some embodiments.

FIG. 5 is a block diagram showing another simplified example of a mapper tree in some embodiments, and showing multiple pointers from a single level 2 node indicating a single super leaf node in the leaf level nodes. In the example of FIG. 5, m=3, and accordingly the mapper tree includes three total levels.

The Upper Level Nodes 554 in FIG. 5 include two levels: a first level (also referred to as "Level 1"), and a second level (also referred to as "Level 2"). The first level is shown including a Level 1 Node 500. The second level is shown including Level 2 Node 502, Level 2 Node 504, Level 2 Node 506, and Level 2 Node 508. The Leaf Level Nodes 556 (also referred to as the "Level 3 nodes") include Level 3 Node 510, which is a leaf node, and Level 3 Node 512, which is a super leaf node containing representations of three leaf nodes. The pointers in Level 2 Node 504 include a single pointer to the leaf node Level 3 Node 510, and additionally three pointers to Level 3 Node 512 (one pointer for each leaf node represented in Level 3 Node 512).

While traversing the mapper tree shown in FIG. 5, Level 3 Node 510 is visited after Level 2 Node 504 based on the pointer to Level 3 Node 510 contained in Level 2 Node 504, e.g. the first pointer in Level 2 Node 504. Accordingly, the pointer in Level 2 Node 504 to Level 3 Node 510 is used to reach Level 3 Node 510 from Level 2 Node 504 while traversing the mapper tree in order to find pages of non-volatile storage used to store host data for pages in the segment in the logical address space corresponding to the leaf node Level 3 Node 510.

Level 3 Node 512 is visited after Level 2 Node 504 while traversing the mapper tree based on the three pointers to Level 3 Node 512 that are contained in Level 2 Node 504, e.g. the second, third and fourth pointers in Level 2 Node 504. For example, each one of the three pointers in Level 2 Node 504 that points to Level 3 Node 512 may be associated with a corresponding one of the leaf nodes that is represented within Level 3 Node 512. Accordingly, each individual one of the pointers in Level 2 Node 504 to Level 3 Node 512 may be used to reach Level 3 Node 512 from Level 2 Node 504 while traversing the mapper tree in order to find the pages of non-volatile storage that are used to store host data for pages in a segment of the logical address space corresponding to the one of the leaf nodes contained in Level 3 Node 512 that is associated with that pointer in Level 2 Node 504.

Figure 6:
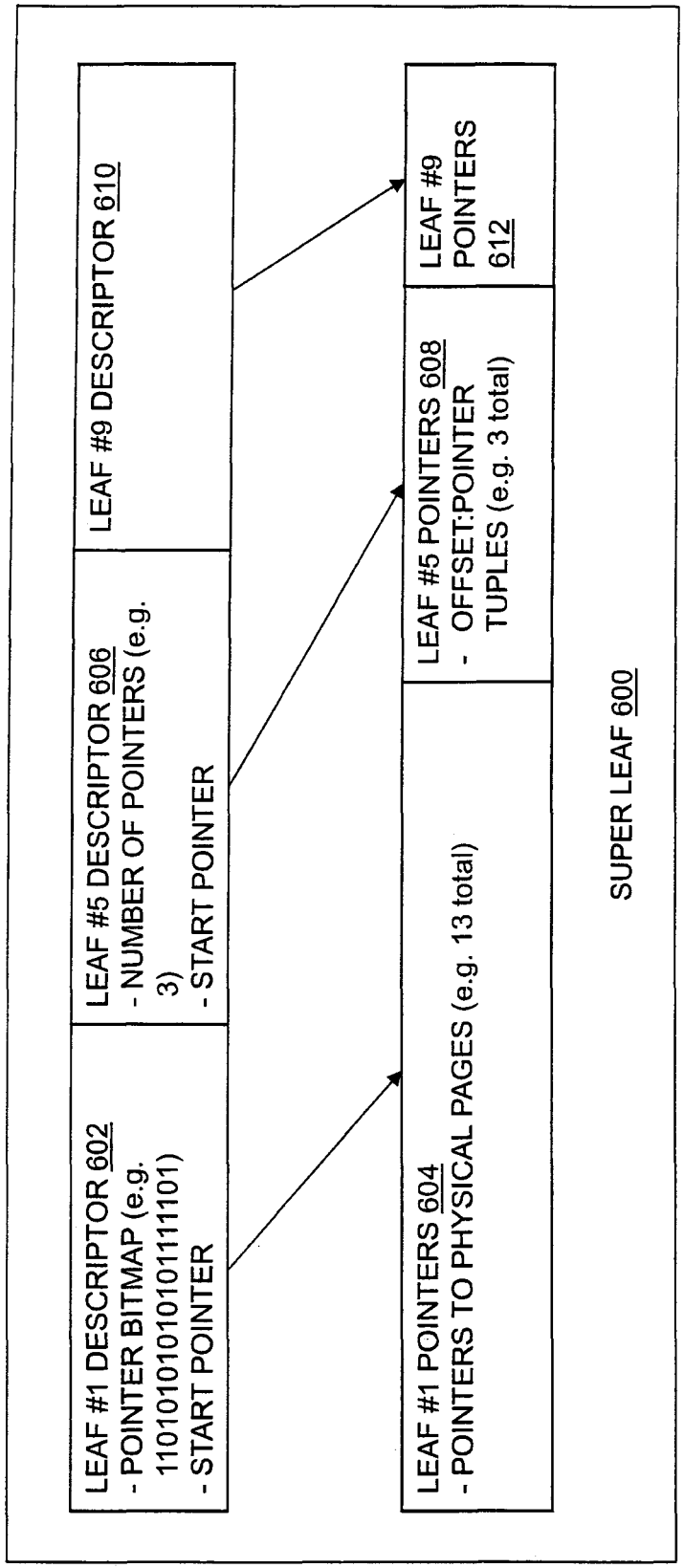
FIG. 6 is a block diagram showing an example of components in a super leaf node in some embodiments.

FIG. 6 is a block diagram showing an example of the format of a Super Leaf Node 600 in some embodiments. In the example of FIG. 6, Super Leaf Node 600 contains representations of three leaf nodes—leaf node #1, leaf node #5, and leaf node #9. Leaf node #1 corresponds to the first segment in the logical address space of the logical volume, leaf node #5 corresponds to the fifth segment in the logical address space of the logical volume, and leaf node #9 corresponds to the ninth segment in the logical address space of the logical volume.

The specific way that a leaf node is represented in Super Leaf 600 may depend on how densely the corresponding segment of the logical address space has been written, e.g. on the total number of pointers to non-volatile storage that are stored to represent the leaf node in Super Leaf 600. For relatively more densely written logical address space segments, for which relatively more pointers to non-volatile storage are stored, the representation of the corresponding leaf node in Super Leaf 600 may include i) a bitmap with bits set in positions corresponding to the specific pages within the segment that have been written, and for which accordingly pointers to pages of non-volatile storage are stored in the representation of the leaf node, and ii) a list of pointers to pages of non-volatile storage that contains a pointer for each bit that is set in the bitmap. The representation of leaf node #1 in Super Leaf 600 is an example of how a leaf node corresponding to a relatively more densely written segment of the logical address space may be represented in Super Leaf 600.

The representation of leaf node #1 includes Leaf #1 Descriptor 602, and Leaf #1 Pointers 604. The combination of Leaf #1 Descriptor 602 and Leaf #1 Pointers 604 is an example of a slot within Super Leaf 600 that contains a representation of leaf node #1. Leaf #1 Descriptor 602 contains a pointer bitmap having bits set in positions corresponding to the specific pages within the logical address space segment corresponding to leaf node #1 that have previously been written. For example, the pointer bitmap in Leaf #1 Descriptor 602 may have a value of 11010101010101111101, indicating that the first, second, fourth, sixth, eighth, tenth, twelfth, fourteenth, fifteen, sixteen, seventeenth, eighteenth, and twentieth pages in the segment corresponding to leaf node #1 have previously been written, and that a pointer to a page of non-volatile storage can be found within the list of pointers in the representation of leaf node #1 in Super Leaf 600 for each one of those thirteen logical address space pages. Leaf #1 Descriptor 602 also includes a start pointer indicating the start of Leaf #1 Pointers 604. Leaf #1 Pointers 604 contains the list of thirteen pointers to physical pages of non-volatile storage corresponding to pages in the corresponding logical address segment indicated by the set bits in the bitmap contained in Leaf #1 Descriptor 602.

For relatively less densely written logical address space segments, the representation of the corresponding leaf node in Super Leaf 600 may include i) an indication of the total number of pointers to pages of non-volatile storage that are stored in the leaf node representation, which is also the total number of pages within the corresponding segment that have previously been written, and ii) a list of tuples, each one of which includes both a pointer to a page of non-volatile storage and an offset of the corresponding page within the segment of the logical address space corresponding to the represented leaf node. The representation of leaf node #5 in Super Leaf 600 is an example of how a leaf node corresponding to a relatively less densely written segment of the logical address space may be represented in Super Leaf 600.

The representation of leaf node #5 includes Leaf #5 Descriptor 606, and Leaf #5 Pointers 608. The combination of Leaf #5 Descriptor 606 and Leaf #5 Pointers 608 is an example of a slot within Super Leaf 600 that contains a representation of leaf node #5. Leaf #5 Descriptor 606 indicates the total number of pointers to pages of non-volatile storage that are stored in the representation of leaf node #5, which is also the total number of pages within the logical address space segment corresponding to leaf node #5 that have previously been written. For example, the total number of pointers stored in the representation of leaf node #5 may be indicated in #5 Descriptor 606 as 3, indicating that the total number of pointers to pages of non-volatile storage that are stored in the representation of leaf node #5 is 3, and also that 3 pages within the logical address space segment corresponding to leaf node #5 have previously been written. Leaf #5 Descriptor 606 also includes a start pointer indicating the start of Leaf #5 Pointers 608. Leaf #5 Pointers 608 contains three OFFSET:POINTER tuples. Each one of the tuples in Leaf #5 Pointers 608 includes both i) an offset of a page within the segment of the logical address space corresponding to leaf node #5, and ii) a pointer to a page of non-volatile storage used to store host data written to that specific page within the segment of the logical address space corresponding to leaf node #5.

The representation of leaf node #9 includes Leaf #9 Descriptor 610, and Leaf #9 Pointers 612. The combination of Leaf #9 Descriptor 610 and Leaf #9 Pointers 612 is an example of a slot within Super Leaf 600 that contains a representation of leaf node #9. The representation of leaf node #9 in Super Leaf 600 may be the type of representation used for leaf nodes having relatively more densely written corresponding logical address space segments, or the type of representation used for leaf nodes having relatively less densely written corresponding logical address space segments, depending on how densely the segment of the logical address space corresponding to leaf node #9 has been written.

Figure 7:
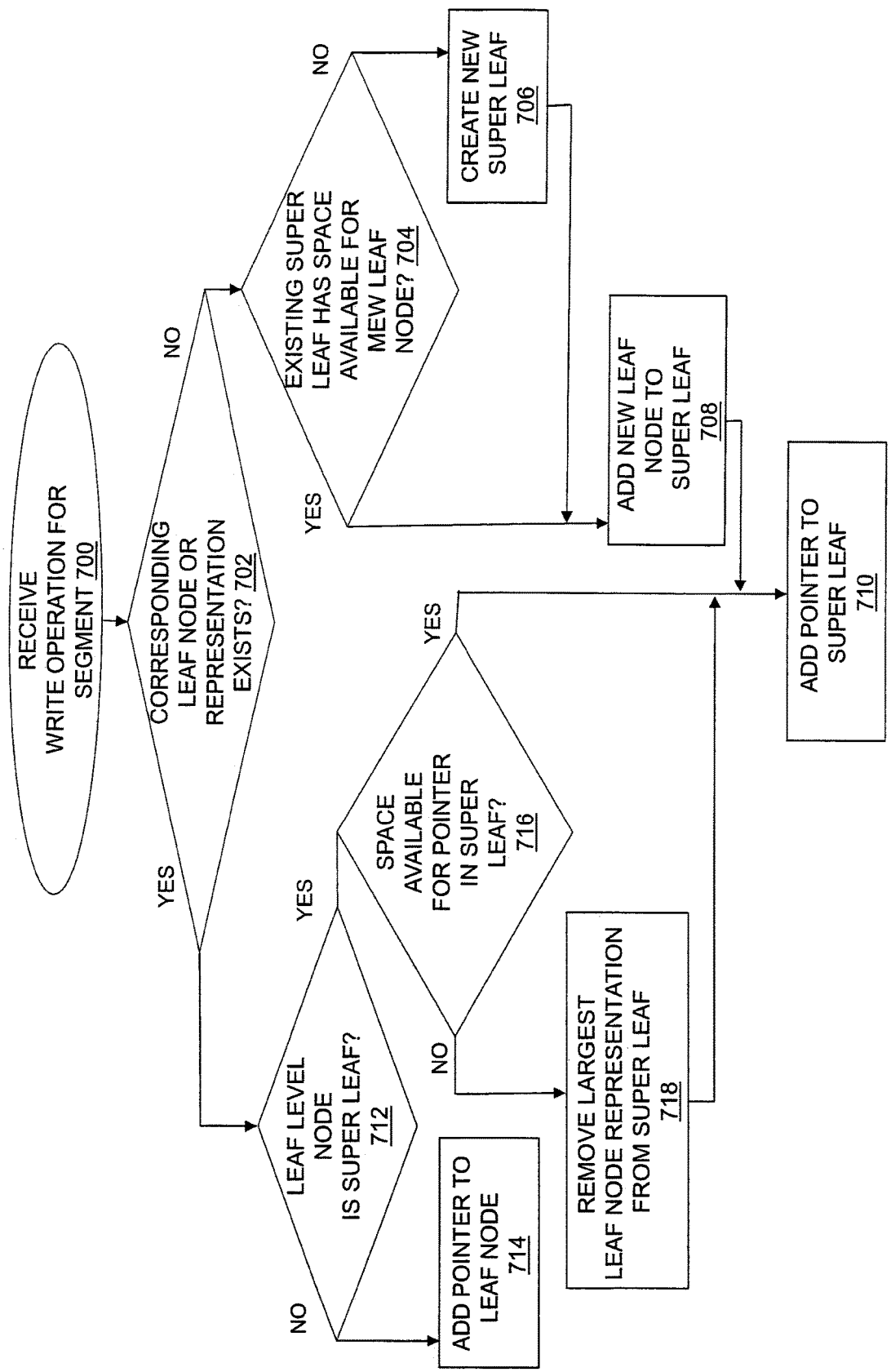
FIG. 7 is a flow chart showing an example of steps that may be performed in some embodiments.

FIG. 7 is a flow chart showing another example of steps that may be performed in some embodiments. In some embodiments, the steps of FIG. 7 may, for example, be performed during operation of the Host I/O Processing Logic 140 shown in FIG. 1.

At 700, a write operation received for a logical volume is directed to a segment within the logical address space of the logical volume. At 702, the disclosed technology detects whether a leaf level node exists for the segment of the logical address space to which the initial write operation is directed. Such an existing leaf level node may be either an existing leaf node corresponding to the segment of the logical address space to which the initial write operation is directed, or an existing super leaf node containing a representation of that leaf node. If no such leaf level node exists, then the write operation is the initial write operation directed to the segment, and step 702 is followed by step 704. Otherwise step 702 is followed by step 712.

In step 704, the disclosed technology detects whether a super leaf node currently exists in the mapper tree that has sufficient available space to store a new representation of a leaf node. If not, step 704 is followed by step 706. Otherwise, step 704 is followed by step 708.

In step 706, the disclosed technology creates a new super leaf node and adds the super leaf node to the mapper tree. Step 706 is followed by step 708.

In step 708, the disclosed technology adds a new leaf node to the previously existing super leaf node, or to the super leaf node created at step 706. For example, at step 708 the disclosed technology adds a representation of the leaf node corresponding to the segment of the logical address space to which the write operation is directed to the super leaf node. Step 708 is followed by step 710, in which a pointer to a page of non-volatile storage allocated to the logical volume is added to the representation of the leaf node that was added to the super leaf node in step 708. The page of non-volatile storage indicated by the pointer added to the super leaf node at step 710 is used to store the host data indicated by the write operation, and is also used when processing subsequently received read and write operations directed to the same page within the logical address space of the logical volume.

At step 712, the disclosed technology detects whether the existing leaf level node corresponding to the segment of the logical address space to which the initial write operation is directed is a super leaf node or a leaf node. If the existing leaf level node is a leaf node, then step 712 is followed by step 714. Otherwise, if the existing leaf level node is a super leaf node, then step 712 is followed by step 716.

In step 714, the disclosed technology adds a pointer to a page of non-volatile storage allocated to the logical volume to the existing leaf node, and the page of non-volatile storage is used to store the host data indicated by the write operation, and also when processing subsequently received read and write operations directed to the same page within the logical address space of the logical volume.

In step 716, the existing leaf level node is a super leaf node, and the disclosed technology detects whether there is sufficient available space in the existing super leaf node to add another pointer to the representation of the leaf node in the existing super leaf node. If not, then step 716 is followed by step 718. Otherwise, if there is room in the super leaf node, step 716 is followed by step 710, in which a pointer to a page of non-volatile storage allocated to the logical volume is added to the representation of the leaf node in the existing super leaf node. The page of non-volatile storage indicated by the pointer added to the super leaf node at step 710 is used to store the host data indicated by the write operation, and is also used when processing subsequently received read and write operations directed to the same page within the logical address space of the logical volume.

At step 718, the disclosed technology identifies the largest representation of a leaf node in the existing super leaf node, e.g. a leaf node representation in the super leaf node that contains the largest number of pointers to pages of non-volatile storage of any leaf node representation in the super leaf node. The disclosed technology then removes the largest leaf node representation from the super leaf node, and creates a separate leaf node for the leaf node represented by that leaf node representation. As a result, the amount of available space is increased in the existing super leaf node, and at step 710 a pointer to a page of non-volatile storage allocated to the logical volume can be successfully added to the representation of the leaf node in the existing super leaf node. The page of non-volatile storage indicated by the pointer added to the super leaf node at step 710 can then be used to store the host data indicated by the write operation, and can also be used when processing subsequently received read and write operations directed to the same page within the logical address space of the logical volume.

Figure 8:
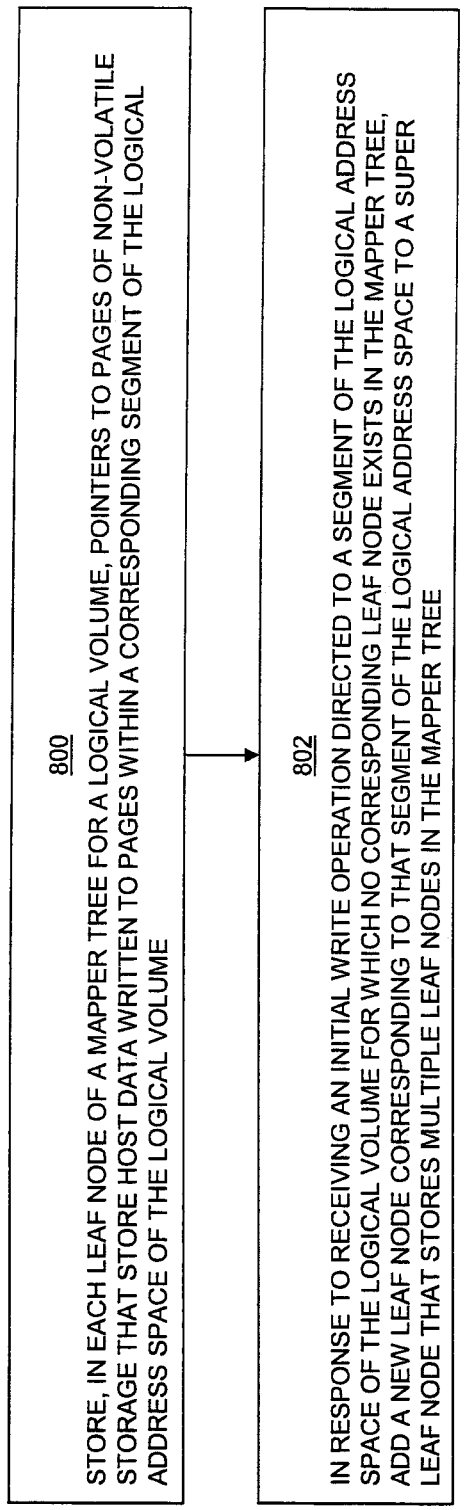
FIG. 8 is a flow chart showing another example of steps that may be performed in some embodiments.

FIG. 8 is a flow chart showing an example of steps that may be performed in some embodiments. In some embodiments, the steps of FIG. 8 may, for example, be performed during operation of the Host I/O Processing Logic 140 shown in FIG. 1.

At step 800, the disclosed technology stores, in each leaf node in a mapper tree for a logical volume, pointers to pages of non-volatile storage that store host data written to pages within a corresponding segment of the logical address space of the logical volume.

At step 802, in response to receiving an initial write operation directed to a segment of the logical address space of the logical volume for which no corresponding leaf node exists in the mapper tree, the disclosed technology adds a new leaf node corresponding to that segment of the logical address space to a super leaf node in the mapper tree that stores multiple leaf nodes. In some embodiments, each super leaf node may include multiple slots, and each slot in a super leaf node may store a representation of a leaf node that is contained in that super leaf node. In such embodiments, at step 802 the disclosed technology may add a leaf node to the super leaf node by adding a representation of the leaf node to the super leaf node, e.g. within a slot within the super leaf node.

As will be appreciated by those skilled in the art, the technologies disclosed herein may be embodied as a system, method or computer program product. Accordingly, each specific feature of the present disclosure may be embodied using hardware, software (including firmware, resident software, micro-code, etc.) or a combination of software and hardware. Furthermore, the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media.

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing a mapper tree for a logical volume, comprising:
   storing, in each leaf node of the mapper tree, pointers to pages of non-volatile storage that store host data written to pages within a corresponding segment of a logical address space of the logical volume;
   in response to receiving an initial write operation directed to a segment of the logical address space of the logical volume for which no corresponding leaf node exists in the mapper tree, adding a new leaf node corresponding to that segment of the logical address space to a super leaf node in the mapper tree that stores multiple leaf nodes; and
   in response to detecting that an amount of available space within the super leaf node is less than a minimum threshold,
      identifying a representation of a leaf node contained in the super leaf node that includes a larger number of pointers to pages of non-volatile storage than any other representation of a leaf node in the super leaf node, and
      removing, from the super leaf node, the representation of the leaf node in the super leaf node that includes a larger number of pointers to pages of non-volatile storage than any other representation of a leaf node contained in the super leaf node.

2. The method of claim 1, further comprising:
   wherein the super leaf node includes multiple slots, each slot in the super leaf node containing a representation of a leaf node that is contained in the super leaf node; and
   wherein adding the new leaf node to the super leaf node includes adding a representation of the new leaf node to the super leaf node.

3. The method of claim 2, wherein adding the representation of the new leaf node to the super leaf node includes adding a pointer to a page of non-volatile storage to the representation of the new leaf node within the super leaf node, wherein the page of non-volatile storage is used to store host data indicated by the initial write operation.

4. The method of claim 3, wherein adding the pointer to the page of non-volatile storage that stores the host data indicated by the initial write operation to the representation of the new leaf node within the super leaf node includes storing a tuple in the representation of the new leaf node, the tuple indicating both the pointer to the page of non-volatile storage used to store the host data indicated by the initial write operation and an offset of the page to which the initial write operation was directed within the segment of the logical address space of the logical volume corresponding to the new leaf node.

5. The method of claim 1, wherein detecting that an amount of available space within the super leaf node is less than a minimum threshold is performed responsive to attempting to add a pointer to a page of non-volatile storage to the super leaf node.

6. The method of claim 1, further comprising:
   in response to detecting that a representation of a leaf node contained in the super leaf node includes a number of pointers to pages of non-volatile storage that exceeds a maximum threshold, removing, from the super leaf node, the representation of the leaf node in the super leaf node that includes a number of pointers to pages of non-volatile storage that exceeds the maximum threshold.

7. The method of claim 6, wherein detecting that a representation of a leaf node contained in the super leaf node includes a number of pointers to pages of non-volatile storage that exceeds a maximum threshold comprises detecting that the representation of the leaf node in the super leaf node includes a number of pointers to pages of non-volatile storage that exceeds a predetermined maximum percentage of a maximum number of pointers to pages of non-volatile storage that can be contained in a leaf node.

8. The method of claim 1, further comprising:
in response to detecting that no super leaf node exists in the mapper tree to store the new leaf node, adding a new super leaf node to the mapper tree prior to adding the new leaf node to the new super leaf node.

9. A data storage system, comprising:
processing circuitry and memory coupled to the processing circuitry, the memory storing instructions for providing a mapper tree for a logical volume, wherein the instructions, when executed by the processing circuitry, cause the processing circuitry to:
  store, in each leaf node of the mapper tree, pointers to pages of non-volatile storage that store host data written to pages within a corresponding segment of a logical address space of the logical volume,
  in response to receiving an initial write operation directed to a segment of the logical address space of the logical volume for which no corresponding leaf node exists in the mapper tree, add a new leaf node corresponding to that segment of the logical address space to a super leaf node in the mapper tree that stores multiple leaf nodes; and
  in response to detecting that an amount of available space within the super leaf node is less than a minimum threshold,
    identify a representation of a leaf node contained in the super leaf node that includes a larger number of pointers to pages of non-volatile storage than any other representation of a leaf node in the super leaf node, and
    remove, from the super leaf node, the representation of the leaf node in the super leaf node that includes a larger number of pointers to pages of non-volatile storage than any other representation of a leaf node contained in the super leaf node.

10. The data storage system of claim 9, further comprising:
wherein the super leaf node includes multiple slots, each slot in the super leaf node containing a representation of a leaf node that is contained in the super leaf node; and
wherein the instructions, when executed, cause the processing circuitry to add the new leaf node to the super leaf node at least in part by causing the processing circuitry to add a representation of the new leaf node to the super leaf node.

11. The data storage system of claim 10, wherein the instructions, when executed, cause the processing circuitry to add the representation of the new leaf node to the super leaf node at least in part by causing the processing circuitry to add a pointer to a page of non-volatile storage to the representation of the new leaf node within the super leaf node, wherein the page of non-volatile storage is used to store host data indicated by the initial write operation.

12. The data storage system of claim 11, wherein the instructions, when executed, cause the processing circuitry to add the pointer to the page of non-volatile storage that stores the host data indicated by the initial write operation to the representation of the new leaf node within the super leaf node at least in part by causing the processing circuitry to store a tuple in the representation of the new leaf node, the tuple indicating both the pointer to the page of non-volatile storage used to store the host data indicated by the initial write operation and an offset of the page to which the initial write operation was directed within the segment of the logical address space of the logical volume corresponding to the new leaf node.

13. The data storage system of claim 9, wherein the instructions, when executed, further cause the processing circuitry to detect that the amount of available space within the super leaf node is less than the minimum threshold responsive to an attempt to add a pointer to a page of non-volatile storage to the super leaf node.

14. The data storage system of claim 9, wherein the instructions, when executed, further cause the processing circuitry to:
  detect that a representation of a leaf node contained in the super leaf node includes a number of pointers to pages of non-volatile storage that exceeds a maximum threshold; and
  in response to detecting that a representation of a leaf node contained in the super leaf node includes a number of pointers to pages of non-volatile storage that exceeds a maximum threshold, remove, from the super leaf node, the representation of the leaf node in the super leaf node that includes a number of pointers to pages of non-volatile storage that exceeds the maximum threshold.

15. The data storage system of claim 14, wherein the instructions, when executed, further cause the processing circuitry to detect that a representation of a leaf node contained in the super leaf node includes a number of pointers to pages of non-volatile storage that exceeds a maximum threshold by causing the processing circuitry to detect that the representation of the leaf node in the super leaf node includes a number of pointers to pages of non-volatile storage that exceeds a predetermined maximum percentage of a maximum number of pointers to pages of non-volatile storage that can be contained in a leaf node.

16. The data storage system of claim 9, wherein the instructions, when executed, further cause the processing circuitry to:
  detect that no super leaf node exists in the mapper tree to store the new leaf node; and
  in response to detecting that no super leaf node exists in the mapper tree to store the new leaf node, add a new super leaf node to the mapper tree prior to adding the new leaf node to the new super leaf node.

17. A computer program product, comprising:
a non-transitory, computer-readable medium having instructions stored thereon that, when executed by processing circuitry in a data storage system, cause the processing circuitry to perform a method of providing a mapper tree for a logical volume, the method comprising the steps of:
  storing, in each leaf node of the mapper tree, pointers to pages of non-volatile storage that store host data written to pages within a corresponding segment of a logical address space of the logical volume;
  in response to receiving an initial write operation directed to a segment of the logical address space of the logical volume for which no corresponding leaf node exists in the mapper tree, adding a new leaf node corresponding to that segment of the logical address space to a super leaf node in the mapper tree that stores multiple leaf nodes; and in response to detecting that an amount of available space within the super leaf node is less than a minimum threshold,
- identifying a representation of a leaf node contained in the super leaf node that includes a larger number of pointers to pages of non-volatile storage than any other representation of a leaf node in the super leaf node, and
- removing, from the super leaf node, the representation of the leaf node in the super leaf node that includes a larger number of pointers to pages of non-volatile storage than any other representation of a leaf node contained in the super leaf node.

* * * * *